United States Patent [19]

Longuepee et al.

[11] 4,126,469

[45] Nov. 21, 1978

[54] SOLUTION AND PROCEDURE FOR DEPOSITING A PROTECTIVE PRECOATING ON SURFACES OF ZINC-COATED FERROUS METAL PARTS AGAINST CORROSION IN PRESENCE OF WATER

[75] Inventors: Michel Longuepee, Cantin; Noel Dreulle, Auby-lez-Douai, both of France

[73] Assignee: International Lead Zinc Research Organization, Inc., New York, N.Y.

[21] Appl. No.: 863,673

[22] Filed: Dec. 23, 1977

Related U.S. Application Data

[63] Continuation of Ser. No. 541,513, Jan. 16, 1975, abandoned.

[30] Foreign Application Priority Data

Jan. 23, 1974 [FR] France .................. 74 02178

[51] Int. Cl.² .................. C09D 5/08; C23F 7/12; C23F 11/08
[52] U.S. Cl. .................. 106/14.12; 106/286; 106/316; 148/6.15 Z; 252/389 A; 427/344
[58] Field of Search .................. 106/1, 14, 74, 286, 106/84; 148/6.15, 6.15 Z

[56] References Cited

U.S. PATENT DOCUMENTS

| | | | |
|---|---|---|---|
| 2,121,574 | 6/1938 | Romig | 148/6 |
| 2,743,205 | 4/1956 | Condon | 148/6.15 |
| 2,835,617 | 5/1958 | Maurer | 148/6.15 Z |
| 3,144,360 | 8/1964 | Palm | 148/6.15 |
| 3,523,043 | 8/1970 | Newell et al. | 148/6.15 Z |
| 3,592,701 | 7/1971 | Pekar | 148/6.15 |
| 3,597,283 | 8/1971 | Snee | 148/6.15 Z |
| 3,634,286 | 1/1972 | Yates | 106/286 |
| 3,917,648 | 11/1975 | McLeod | 106/1 |

FOREIGN PATENT DOCUMENTS

| | | | |
|---|---|---|---|
| 157,600 | 7/1954 | Australia | 148/6 |
| 1,200,640 | 9/1965 | Fed. Rep. of Germany. | |
| 830,150 | 7/1938 | France | 148/6 |
| 944,419 | 12/1963 | United Kingdom. | |

OTHER PUBLICATIONS

Piatti, "Passivierung und Schutzschietenbildung in Aufbereiten Wassern", Korrosion X, (Verlag Chemie GmbH, Weinheim, West Germany) 1958, pp. 31-35.

Hatch, Polyphosphate Inhibitors in Potable Water, Materials Protection, Nov. 1969, pp. 31-35.

Zinc Research Digest No. 30, International Lead Zinc Research Organization, Inc., N.Y.C., Mar. 26, 1973, pp. 27 & 28.

Zinc Research Digest No. 31.

Ibid, Aug. 17, 1973, p. 42.

Primary Examiner—Allan Lieberman
Attorney, Agent, or Firm—Brumbaugh, Graves, Donohue & Raymond

[57] ABSTRACT

Solution and procedure of depositing a coating on the surfaces of zinc-coated ferrous metal parts which protects against corrosion in the presence of water. The solution is made up by adding to water, perliter of final solution, of 1 to 40 grams of sodium metasilicate, 14 to 40 milliliters of phosphoric acid, specific gravity 1.71, from 1 to 40 grams of sodium nitrate, from 10 to 50 grams of anhydrous zinc chloride and the pH is adjusted to a value between 2.3 and 3.8. Preferably nickel chloride is added. For use, the solution is heated to a temperature ranging from 15° to 75° C and brought into contact with the parts to be treated for a period from 20 to 72 hours. The deposit is continuous, hard, resistant to shocks and abrasion and imparts an efficient and lasting protection to galvanized parts in corrosive waters. The invention is useful for the protection of piping in the building industry.

11 Claims, No Drawings

SOLUTION AND PROCEDURE FOR DEPOSITING A PROTECTIVE PRECOATING ON SURFACES OF ZINC-COATED FERROUS METAL PARTS AGAINST CORROSION IN PRESENCE OF WATER

This is a continuation, of application Ser. No. 541,513 filed Jan. 16, 1975, now abandoned.

This invention relates to a technique for protecting the surfaces of zinc-coated ferrous metal parts against corrosion in the presence of water and especially inner surfaces of zinc-coated steel piping, as well as to the procedure for obtaining such deposits.

It is common practice to protect ferrous metal parts immersed into water and especially water distribution piping by a zinc coating; such coatings are usually called galvanized.

Zinc, being more electronegative than steel, protects the latter against corrosion by preferentially dissolving itself. This dissolution is delayed and slowed down by a layer of insoluble salts formed by displacement of mineral salts in solution in water. However, the formation of these protective salts is slow and does not always ensure the complete protection of zinc, especially if the water is hot, if it has a low mineral salts content (degree of water hardness near zero) or if it contains metal such as copper which act as a catalyst for the attack on zinc. It has been stated that corrosion is considerably accelerated by water having a temperature between 60° and 80° C. and that traces of copper even at a concentration as low as 1 ppm (part per million) have a pronounced catalytic corrosive effect. Moreover, the more and more frequent use of water softeners, which lowers the degree of hardness by ion exchange, in the water distribution systems, increases the danger of premature corrosion of galvanized parts.

In order to obviate these dangers of corrosion, so-called water "vaccination" techniques are sometimes used which consist in adding continuously measured quantities of silicates or metaphosphates. Most of these salts remain in the distributed water and their presence, in particular that of phosphates, in water intended for consumption by human beings raises questions about hazards to the health of the people who drink such water.

The applicant has discovered that it is possible to bring about a continuous deposit, insoluble in hot or cold water which efficiently protects zinc against corrosion, even in hot water having a low degree of hardness and a significant copper content, by bringing the galvanized parts to be protected into contact with a solution containing silicates or metaphosphates in a phosphoric medium having a low pH value, in the presence of zinc ions; the deposit can be rapidly achieved and gives lasting protection.

Thus, this invention provides a solution intended for rapidly depositing a coating which protects the surface of zinc-coated ferrous metal parts against corrosion in the presence of water, and is characterized by the fact that it is built-up by adding to water, per liter of final solution, from 1 to 40 grams of sodium metasilicate, 14 to 40 milliliters of phosphoric acid of a density of 1.71, from 1 to 40 grams of sodium nitrate and 10 to 50 grams an anhydrous zinc chloride; the pH value of the solution being adjusted to a value between 2.3 and 3.8 by the addition of calcium carbonate.

In a variant, the solution is characterized by the fact that it contains in addition up to 70 grams of sodium hexametaphosphate per liter of final solution.

The solutions may also be made up by combining with the zinc chloride and phosphoric acid mentioned above an amount of metasilicate equivalent to 1 to 40 grams per liter of sodium metasilicate, and an amount of nitrate equivalent to 1 to 40 grams per liter of sodium nitrate.

These solutions are used in a process of depositing a protective coating on zinc-coated ferrous metal parts characterized by the fact that a solution of the type that precipitates at room temperature is made up, that this solution is filtered after adjustment of the pH value, heated to a working temperature ranging from 15° to 75° C., that this solution is brought into contact with the aforesaid parts for a period ranging from 20 to 72 hours, at the aforesaid working temperature, and that the aforesaid part is then rinsed with water.

According to an advantageous form of the process of depositing a protective coating on the inner surface of zinc-coated steel piping, the aforesaid solution is brought into contact with the aforesaid inner surface by circulation, preferably intermittent, of the aforesaid solution, and a filter is placed in the aforesaid circulating system.

According to another advantageous form of the process of treating the parts before mounting them, these zinc-coated ferrous metal parts are immersed into the aforesaid solution contained in a vessel, this solution is stirred by its being recycled and filtered.

The characteristics and advantages of this invention appear from the following examples:

EXAMPLE 1

A solution is made up according to the following formula for one liter of solution:
- 35 g of sodium hexametaphosphate
- 5 g of sodium metasilicate
- 15 ml of phosphoric acid (specific gravity = 1.71)
- 14 g of sodium nitrate
- 5 g of crystallized nickel chloride ($NiCl_2.6H_2O$)
- 20 g of anhydrous zinc chloride
- calcium carbonate to bring to a pH value of about 2.8

EXAMPLE 2

A solution is made up, according to the following formula for one liter of solution:
- 20 g of sodium metasilicate
- 17 ml of phosphoric acid (specific gravity = 1.71)
- 20 g of sodium nitrate
- 5 g of crystallized nickel chloride ($NiCl_2.6H_2O$)
- 20 g of anhydrous zinc chloride
- calcium carbonate to bring the pH value of the solution to 3.6.

EXAMPLE 3

A solution is used according to example 1.
Working temperature of the solution: 65° to 75° C.
Time necessary for the formation of the deposited coating: 20 hours or preferably 24 hours.
Mode of formation: By continuous, or preferably intermittent circulation of the solution, after passing through a glass wool filter
Nature of the coating: Zinc phosphate.

EXAMPLE 4

A solution is used according to example 2.

Working temperature of the solution: between 15° and 25° C.

Time of formation of the deposited coating: 72 hours

Mode of formation: By continuous or preferably intermittent circulation of the solution.

Nature of the coating: Mixture of phosphates and zinc silicates.

Results of Corrosion Testing

The tests have been carried out on test pieces which have been treated according to example 3 as well as on untreated reference test pieces, in the following conditions:
water temperature: 80° C.
French degree of water hardness: 0
Copper content: 1 ppm
Duration of test:

| | | |
|---|---|---|
| 2 months | (test piece | intact |
| | (reference test piece | strongly rusted as scattered corrosion pits |
| 9 months | (test piece | practically intact |
| | (reference test piece | all over covered with corrosion pits |

The deposits obtained are continuous, hard, and resistant to abrasion and shocks without flaking. The protection of zinc obtained is efficient in the most unfavorable corrosion conditions, namely in hot water having a low degree of hardness and a significant copper content. The formation of the protective deposit is rapid. When a water distribution system of a new building is put into service, the treatment of the pipings does not cause an appreciable delay to the completion of the assembly. The coating obtained remains hard and adherent in hot and cold water and does not contaminate these waters, which remain suitable for consumption by human beings.

The nickel chloride added as a hexahydrate proved an efficient deposit accelerator. It is obvious that its presence is not indispensable and that moreover the addition of other deposit accelerators to the solution of the present invention is included within its scope.

We claim:

1. A solution intended for depositing rapidly a coating which protects the surfaces of zinc-coated ferrous metal parts, characterized by containing water as the solvent and per liter of final solution, from 1 to 40 grams of sodium metasilicate, from 14 to 40 milliliters of phosphoric acid having a specific gravity of 1.71, from 1 to 40 grams of sodium nitrate, from 10 to 50 grams of anhydrous zinc chloride, the pH of the aforesaid solution being adjusted to a value between 2.3 and 3.8.

2. A solution according to claim 1, characterized by its containing in addition up to 70 grams of sodium hexametaphosphate per liter of final solution.

3. A solution according to claim 2, which contains also nickel chloride introduced before adjusting the pH of the solution in a quantity equivalent to from 0.5 to 20 grams of hexahydrated nickel chloride per liter of final solution.

4. A solution according to claim 1 which contains also nickel chloride introduced before adjusting the pH of the solution in a quantity equivalent to from 0.5 to 20 grams of hexahydrated nickel chloride per liter of final solution.

5. A solution according to claim 1, wherein the adjustment of pH is made by the progressive addition of calcium carbonate.

6. A solution intended for depositing rapidly a coating which protects the surfaces of zinc-coated ferrous metal parts, comprising water as the solvent, and per liter of final solution, an amount of metasilicate equivalent to 1 to 40 grams of sodium metasilicate, 14 to 40 milliliters of phosphoric acid having a specific gravity of 1.71, an amount of nitrate equivalent to 1 to 40 grams of sodium nitrate, and 10 to 50 grams of anhydrous zinc chloride, the pH of the aforesaid solution being adjusted to a value between 2.3 and 3.8.

7. A solution according to claim 6, containing in addition an amount of hexametaphosphate equivalent to up to 70 grams of sodium hexametaphosphate per liter of final solution.

8. A composition containing an amount of metasilicate equivalent to 1 to 40 parts by weight of sodium metasilicate, 14 to 40 parts by volume of phosphoric acid having a specific gravity of 1.71, an amount of nitrate equivalent to 1 to 40 parts by weight of sodium nitrate, 10 to 50 parts by weight of anhydrous zinc chloride, and a sufficient amount of a pH-regulating compound such that an aqueous solution of said composition which contains 10 to 50 grams per liter of zinc chloride will have a pH between 2.3 and 3.8.

9. A composition according to claim 8 and further containing an amount of hexametaphosphate equivalent to up to 70 parts by weight of sodium hexametaphosphate.

10. A composition according to claim 9 and further containing an amount of nickel chloride equivalent to 0.5 to 20 parts by weight of hexahydrated nickel chloride.

11. A composition according to claim 8 and further containing an amount of nickel chloride equivalent to 0.5 to 20 parts by weight of hexahydrated nickel chloride.

* * * * *